United States Patent [19]

Vaillant et al.

[11] 3,924,876
[45] Dec. 9, 1975

[54] APPARATUS FOR INSTALLING A HEAVY MOBILE MACHINE IN A WORKING POSITION

[75] Inventors: Christian Vaillant, Douchy les Mines; Jean Pierre Menissez, Wavrechain sous Denain, both of France

[73] Assignee: Fives-Cail Babcock, Paris, France

[22] Filed: Nov. 15, 1973

[21] Appl. No.: 416,198

[30] Foreign Application Priority Data
Nov. 17, 1972   France ............................ 72.40860

[52] U.S. Cl. .............................. 280/150.5; 212/145
[51] Int. Cl.² .......................................... B60S 9/10
[58] Field of Search .......... 280/150.5, 150 A, 43.23; 212/145; 180/119

[56] References Cited
UNITED STATES PATENTS

| | | |
|---|---|---|
| 3,093,362 | 6/1963 | Schaefer ...................... 280/150.5 X |
| 3,442,530 | 5/1969 | Guinot ............................ 280/150.5 |
| 3,786,893 | 1/1974 | Joyce Jr., et al. .................. 180/119 |

Primary Examiner—Leo Friaglia
Assistant Examiner—Michael J. Forman
Attorney, Agent, or Firm—Kurt Kelman

[57] ABSTRACT

A mobile crusher unit or like machine is selectively supported on wheels with pneumatic tires for displacement to a working site and on retractable support feet at the working site. The support feet are placed slightly above ground at the working site, locked in this position, and the pneumatic tires are then deflated until the support feet are in contact with the ground and at least a portion of the machine weight has been transferred to the support feet. The machine comprises a pneumatic circuit connected to all the pneumatic tires for simultaneously inflating and deflating them. Inflation of the tires enables the machine to be displaced to the working site and keeps the feet in their lowered position off the ground while deflation of the tires permits the locked feet in the lowered position to support the machine in the working position.

4 Claims, 6 Drawing Figures

APPARATUS FOR INSTALLING A HEAVY MOBILE MACHINE IN A WORKING POSITION

The present invention relates to improvements in mobile crusher units or like machinery, and to a method of installing the same in a working position. Mobile machinery of this general type is selectively supported on wheels with pneumatic tires for displacement to a working site and on support feet at the working site. Generally, to install such a heavy machine in a working position after it has been displaced to the working site, jacks are used to bring the support feet into contact with the ground after which the machine is lifted sufficiently to disengage the pneumatic tires completely from the ground. It is also possible to lift the entire unit off the ground by means of support jacks placed between the chassis and the ground, and then to lower the support feet into contact with the ground, in which position they are locked for support of the unit in the working position. This procedure is reversed when it is desired to return the unit from the working into the displacement position.

In either case, the jacks must be strong enough to support the entire unit. In cases where the machine weighs several hundred tons, this requires either exceedingly powerful jacks or a great number of smaller jacks.

It is the primary object of this invention to provide a mobile crusher unit or like heavy machine of the general type indicated hereinabove which is much more economical to operate than conventional machinery of this type and which entirely dispenses with the need for lifting jacks.

This and other objects are accomplished in accordance with the invention by displacing the crusher unit or like machine to the working site on the wheels, placing the support feet at the working site slightly above the ground, locking the support feet in their position slightly above the ground, and then deflating the pneumatic tires until the support feet are in contact with the ground and at least a portion of the weight of the crusher unit or like machine has been transferred to the support feet.

A crusher unit or like machine comprises, according to the present invention, means for mechanically locking the feet in a lowered or working position, and a penumatic circuit including a source of pneumatic fluid connected to all pneumatic tires for simultaneously inflating and deflating all the tires. Inflation of the tires by the pneumatic circuit enables the chassis to be displaced to the working site and keeps the feet in their lowered position off the ground while deflation of the tires by the pneumatic circuit permits the locked feet in the lowered position to contact the ground whereby the chassis is supported on the feet in the working position.

The above and other objects, advantages and features of this invention will become more apparent from the following detailed description of a now preferred embodiment thereof, taken in conjunction with the accompanying drawing wherein.

Figure 4:
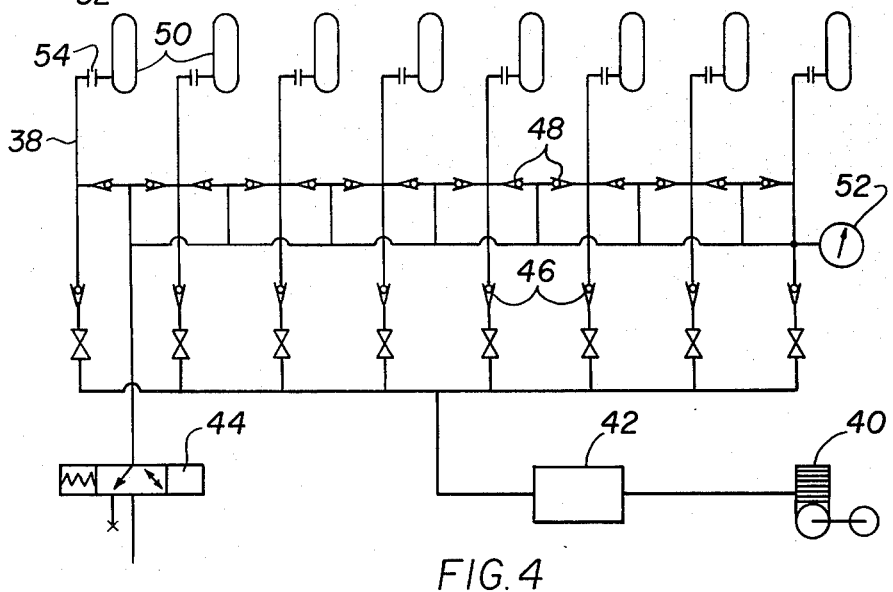

FIG. 4 schematically shows the penumatic circuit of the unit; and

Figure 5:
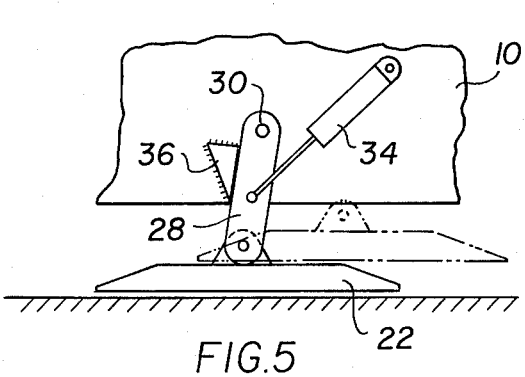
Figure 6:
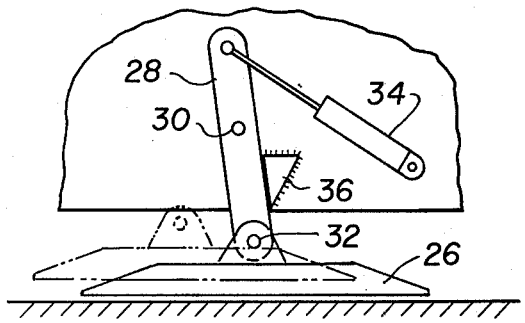

FIGS. 5 and 6 are elevational views, on an enlarged scale, of the support foot structure.

The illustrated mobile crusher unit comprises chassis 10 resting on four axles 12 and carrying crusher 14. The crusher receives material from feed assembly 16 and the crushed material is removed from crusher 14 by recovery conveyor 18 which moves the crushed material to conveyor 20 which may be lowered and raised, as well as directed in any desired manner. Two of the axles are orientable and serve to direct the unit during its displacement on the ground, at least certain of the wheels being driven. A useful system for displacing the unit on pneumatic wheels has been described and claimed in our U.S. application Ser. No. 416,199, now U.S. Pat. No. 3,848,817, Nov. 19, 1974, filed simultaneously herewith and entitled "Self-Propelled Crusher Unit".

In addition to the axles supporting the unit during displacement from one working site to another, the unit also comprises three support feet 22, 24 and 26. A pair of feet 22 and 24 is position side-by-side at the front of the unit while foot 26 is positioned at the rear thereof.

Figure 1:
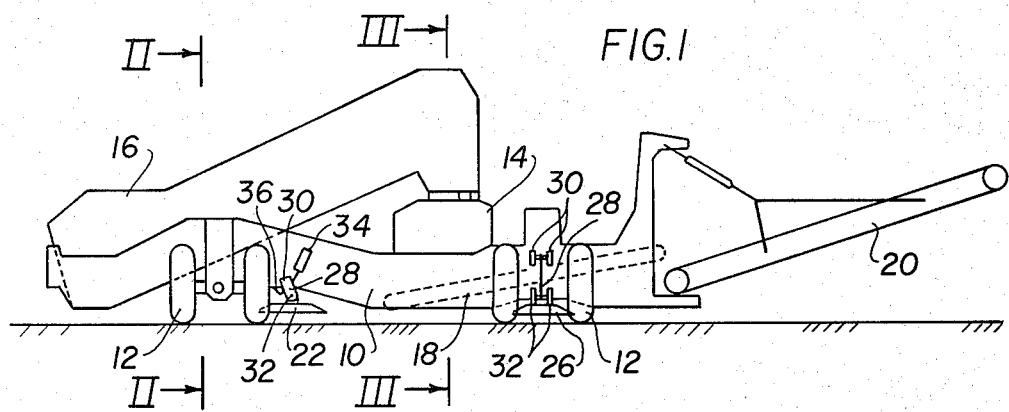
FIG. 1 is an end elevational view of a mobile crusher unit, with the wheels in position for displacement of the unit.

As best shown in FIGS. 5 and 6, each foot is mounted at the end of oscillating arm 28 pivoted to chassis 10 on horizontal axle 30 which is integral with, or affixed to, the chassis. The feet are pivoted to the arm ends by horizontal axles 32 which are parallel to axles 30 which pivot the arms 28 to chassis 10. Support arms 28 and the feet pivoted thereto are movable between the working position shown in FIGS. 2, 3, 5 and 6 and a retracted position, as shown in FIG. 1, by hydraulic jack 34, the retracted position being illustrated in broken lines in FIGS. 5 and 6. In the modification of FIG. 6, the hydraulic jacks have one end linked to chassis 10 while the other end thereof is linked to the end of support arm 28 opposite to the arm end supporting the foot. Operation of the jack will pivot the support arm about axle 30 to position the foot in its selected position. In FIG. 5, jack 34 is linked to arm 28 intermediate its ends.

The working position is fixed when arm 28 comes into contact with associated abutment 26 affixed to the chassis and arranged for engagement with the arm beyond the equilibrium position of the arm. In this position, the arm is slightly inclined to the vertical so that it is pressed against the the abutment when an upward push is applied to the foot, thus assuring automatic mechanical locking of the arm into position.

In the working position (FIGS. 5 and 6), all the support feet are at the same level and, when the pneumatic tires are inflated to their normal pressure, the feet are not in contact with, but slightly above, the ground.

Figure 2:
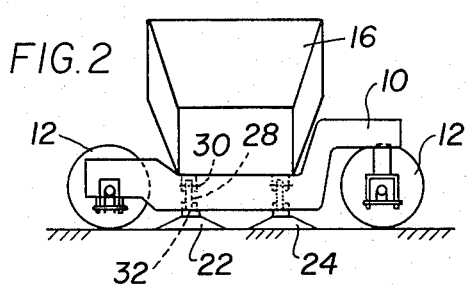
FIG. 2 is a section along line II of FIG. 1.
Figure 3:
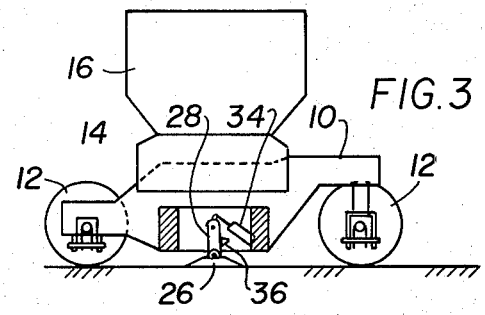
FIG. 3 is a section along line III of FIG. 1, FIGS. 2 and 3 showing the wheels deflated and the support feet placing the unit in working position.

To install the unit in the working position after it has been displaced on the inflated tires at their normal pressure to the working site, the feet are lowered into their working position by jacks 34 and pneumatic tires 50 are then deflated until the feet rest on the ground, as shown in FIGS. 2 and 3. By controlling the degree of tire deflation, the amount of weight supported respectively by the tires and the support feet may be regulated. It is preferred to deflate the tires sufficiently to transfer the major portion of the weight to the support feet while only a small portion of the unit weight will be carried by the tires during the working of the crusher unit.

After work has been completed and it is desired to move the unit to another site, the tires are inflated again to their normal pressure, which will move the support feet out of contact with the ground. To avoid the possibility of the lowered feet hitting obstacles on the ground during displacement of the unit, the feet are retracted by jacks 34 into the position shown in broken lines in FIGS. 5 and 6. The machine is now ready to be displaced to the new working site.

It will be noted that the jacks 34 are never used when the unit rests on the support feet and that they are never subjected to any load when the loads are carried entirely by axles 30 and abutments 36. The jacks serve only for retraction of the support feet when the unit rests on its wheels and, therefore, they may be of relatively small dimension and limited power. Obviously, other suitable means may be used for retracting the support feet, including manually operated or motor-driven mechanisms.

FIG. 4 schematically illustrates the pneumatic circuit used for inflating and deflating all the tires simultaneously. This system comprises a source of pneumatic fluid connected to all pneumatic tires and constituted by compressor 40, fluid pressure regulator 42 being placed in the fluid line connecting the compressor to the tires. It also includes an electrically controlled distributor connecting all the tires to the atmosphere, a first series of check valves 46 being arranged between the compressor and the tires to permit only unidirectional flow of the compressed fluid from the compressor to the tires, and a second series of check valves 48 arranged between the tires and the distributor and placed in a branch conduit between the first check valves and the tires. All tires 50 are permanently connected to this pneumatic system by means of hoses 38 connected to the tires by couplings 54.

As shown, each tire is connected to the compressor by a hose wherein a check valve 46 is mounted to permit only unilateral flow of compressed air from compressor 40 to each tire 50. A branch conduit leads from each connecting hose to distributor 44, each branch conduit having arranged therein a check valve 48 which permits only flow of air from the tire to the distributor. The branch conduits are connected to the hoses at a point between check valve 46 and the tire.

Check valves 46 replace the valves usually used on pneumatic tires and which are eliminated in the present pneumatic system to permit air to escape from the tires through distributor 44 when the latter has been opened. For this purpose, the branch conduits carrying check valves 48 and leading to distributor 44 must be connected to the fluid conduits between the tires and check valves 46.

Valves 48 prevent all the tires from becoming deflated in case of one flat due to bursting of one tire or failure of one conduit hose while permitting the simultaneous deflating of all the tires when the districutor is opened. The distributor may be manually controlled and closed when the pressure in the tires, indicated by manometer 52, has reached the desired level. It may also be automatically controlled by a servo-mechanism controlled by the manometer.

While the invention has been described in connection with a crusher unit, it is obviously applicable to any heavy machinery which moves on pneumatic tires and is supported on feet during operation.

What we claim is:

1. In a mobile crusher unit or like machine which comprises a chassis, wheels with pneumatic tires supporting the chassis on the ground for displacement of the chassis to a working site, and retractable support feet supporting the chassis on the ground at the working site in a working position:
   1. means for mechanically locking the feet in a lowered or working position, and
   2. a pneumatic circuit including a source of pneumatic fluid connected to all pneumatic tires for simultaneously inflating or deflating all the tires,
      a. inflation of the tires by the pneumatic circuit enabling the chassis to be fully supported for displacement the working site and keeping the feet in their lowered position off the ground, and
      b. deflation of the tires by the pneumatic circuit permitting the locked feet in the lowered position to contact the ground whereby the chassis is supported on the feet in the working position.

2. In a mobile crusher unit or like machine which comprises a chassis, wheels with pneumatic tires supporting the chassis on the ground for displacement of the chassis to a working site, and retractable support feet supporting the chassis on the ground at the working site in a working position:
   1. oscillating arms pivoted to the chassis and having ends whereon the feet are mounted,
   2. means for mechanically locking the feet in a lowered or working position, the locking means including
      a. abutments affixed to the chassis and arranged for engagement by the arms, engagement of the arms with the abutments locking the feet in their working position, and the arms being pressed against the abutments by the weight of the crusher unit or like machine when the same rests on the feet, and
   3. a pneumatic circuit including a source of pneumatic fluid connected to all pneumatic tires for simultaneously inflating or deflating all the tires.

3. In the mobile crusher unit or like machine of claim 2, hydraulic jacks connected to the arms for pivoting the same between a retracted and the working position.

4. In a mobile crusher unit or like machine which comprises a chassis, wheels with pneumatic tires supporting the chassis on the ground for displacement of the chassis to a working site, and retractable support feet supporting the chassis on the ground at the working site in a working position:
   1. means for mechanically locking the feet in a lowered or working position, and
   2. a pneumatic circuit including
      a. an air compressor and conduits connecting the compressor to each of the pneumatic tires for simultaneously inflating or deflating all tires,
      b. a distributor actuatable to be opened to the atmosphere,
      c. first check valves in the conduits to permit only unidirectional flow of the compressed air from the compressor to the tires,
      d. second check valves in the conduits to permit unidirectional flow of compressed air from the pneumatic tires to the distributor,
      e. the conduit lines leading to the distributor being arranged between the pneumatic tires and the first check valves and the second check valves being mounted in the said conduit lines, f. inflation of the tires by the pneumatic circuit enabling the chassis to be fully supported for displacements to the working site and keeping the feet in their lowered position off the ground, and g. deflation of the tires by the pneumatic circuit permitting the locked feet in the lowered position to contact the ground whereby the chassis is supported on the feet in the working position.

* * * * *